Oct. 26, 1971   P. J. STATILE   3,614,938
SHIP CONNECTION
Filed Nov. 24, 1969   4 Sheets-Sheet 1

INVENTOR:
PETER J. STATILE
BY  Peter S. Taylor
ATTORNEY

Oct. 26, 1971   P. J. STATILE   3,614,938
SHIP CONNECTION
Filed Nov. 24, 1969   4 Sheets-Sheet 2

INVENTOR:
PETER J. STATILE
BY *Peter L. Tailer*
ATTY.

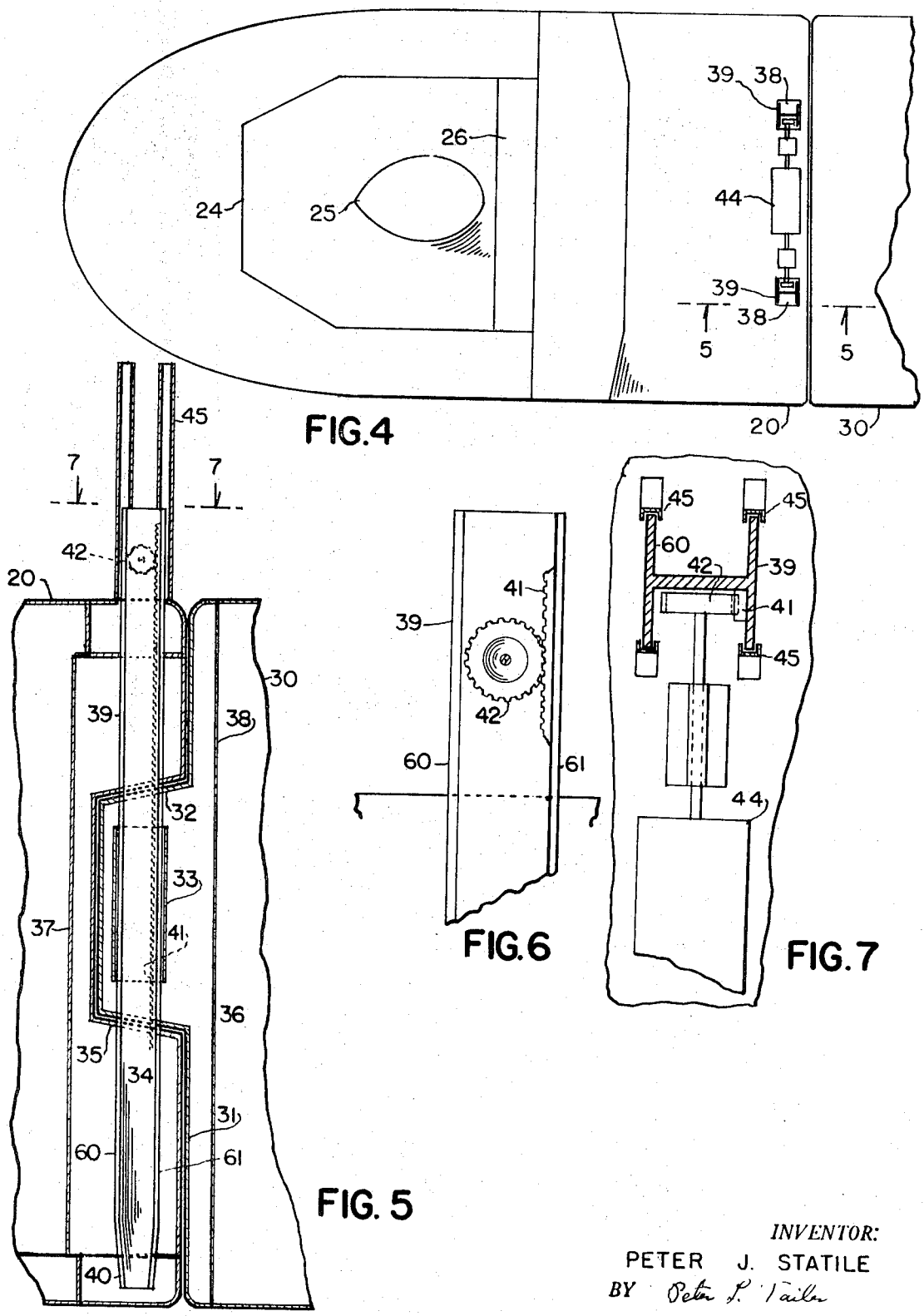

Oct. 26, 1971  P. J. STATILE  3,614,938
SHIP CONNECTION

Filed Nov. 24, 1969  4 Sheets-Sheet 4

*INVENTOR:*
PETER J. STATILE
BY Peter J. Tailer
ATTY

United States Patent Office 3,614,938
Patented Oct. 26, 1971

3,614,938
SHIP CONNECTION
Peter J. Statile, 161 Parkville Ave.,
Brooklyn, N.Y. 11230
Filed Nov. 24, 1969, Ser. No. 879,167
Int. Cl. B63b 21/00
U.S. Cl. 114—235                                  9 Claims

ABSTRACT OF THE DISCLOSURE

A ship has an aft propulsion section and a bow cargo section releasably connected together by vertical I beam pins transfixing mating projections and recesses. The pins may be withdrawn upwardly by a winch driven spur gear which engages a rack on each pin.

BACKGROUND OF THE INVENTION

Propulsion sections of cargo ships are relatively expensive compared to their cargo sections so that ships formed as freely interchangeable propulsion and cargo sections would have a great advantage. Cargo sections could be loaded or repaired while propulsion sections were continually kept in service with additional cargo sections. To provide vessels with interchangeable sections, a practical means to releasably connect the sections is required.

SUMMARY OF THE INVENTION

A cargo ship has an aft propulsion section containing ballast tanks and a forward cargo section having a dry cargo, a bulk cargo, a tanker, or a like configuration. The mating substantially vertical transverse bulkheads of the ship have corresponding projections and recesses which are transfixed by I beam pins to lock the ship sections together. The pins are disposed vertically, have their flanges disposed fore and aft, and may taper about three inches for each twenty-five feet of length. Fixed to the inner surface of a flange of each pin is a section of rack gear engaged by a winch driven pinion to raise and lower the pin disconnecting and connecting the sections.

This invention enjoys many advantages in that ships' propulsion sections are very costly in relation to their cargo sections. Thus it is a great advantage to have a propulsion section which need never be idle as it can leave one cargo section and pick up another and thus not be held up during the period of discharge and loading. Further, the less costly cargo sections can be built and scrapped as they depreciate while the propulsion sections are maintained for longer periods of service. Many other advantages for sectional ships exist.

The specific ship connection of this invention is both simple and practical. A connection of this type must withstand the great stresses involved and still be reliable in operation and not excessively costly.

BRIEF DESCRIPTION OF THE DRAWING

FIG. 4 is a top view of a connected aft propulsion section and a fragment of a cargo section;

FIG. 5 is a vertical section taken on line 5—5 of FIG. 4;

FIG. 6 is a side view of a fragment of a pin with a rack gear fixed thereon engaged by a pinion;

FIG. 7 is a horizontal section taken on line 7—7 of FIG. 5; and

DESCRIPTION OF THE PREFERRED EMBODIMENTS

Figure 1:
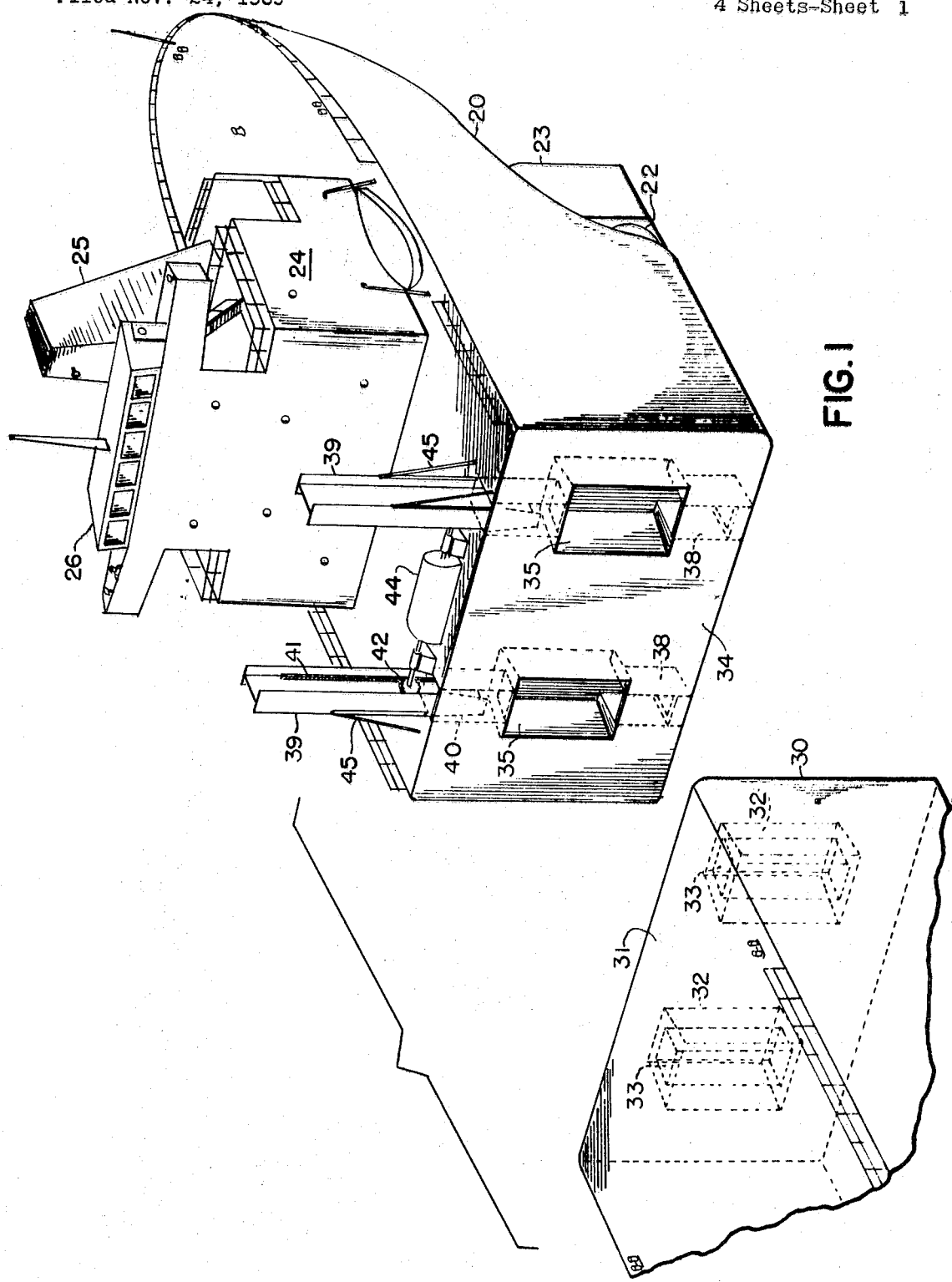
FIG. 1 is a perspective view of a ship's propulsion section shown disconnected from a fragment of a cargo section.
Figure 2:
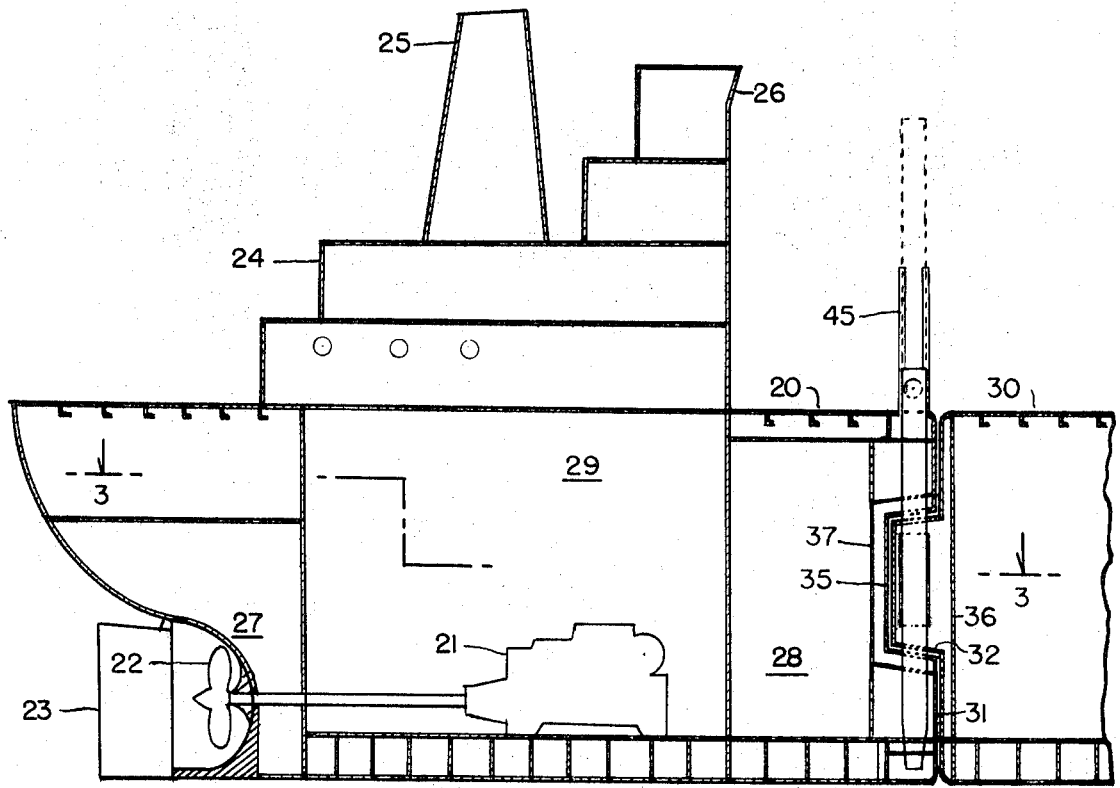
FIG. 2 is a longitudinal, vertical section through a connected aft propulsion section and a fragment of a cargo section taken on line 2—2 of FIG. 3.
Figure 3:
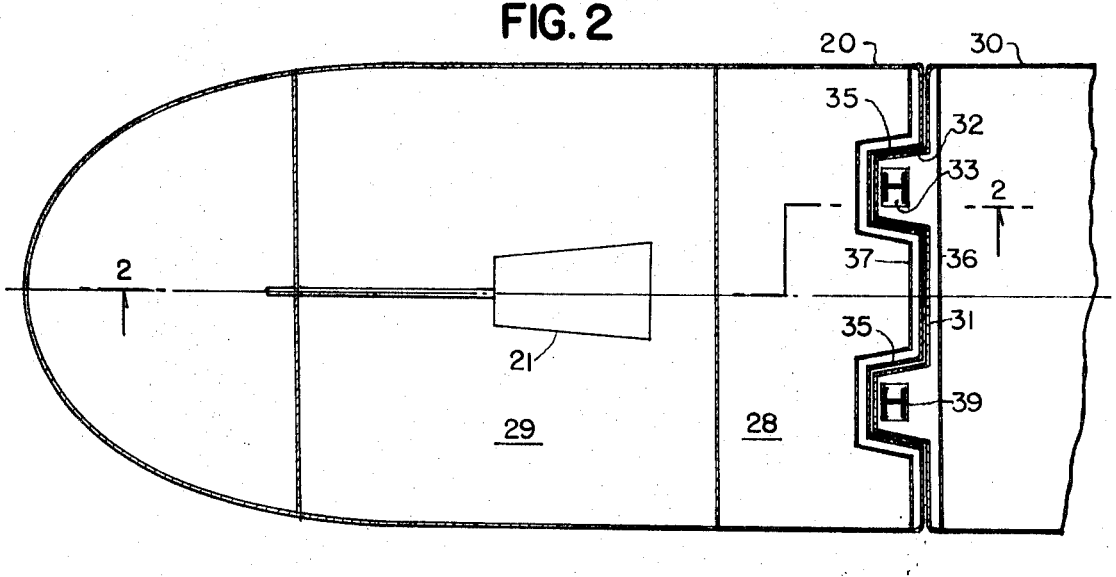
FIG. 3 is a horizontal section taken on line 3—3 of FIG. 2.

As shown in FIGS. 1–7, a ship has an aft propulsion section 20 having a propulsion unit 21, propeller 22, rudder 23, deck house 24, funnel 25, and bridge 26. The propulsion section 20 contains at least the ballast tanks 27 and 28 disposed aft and forward of the engine compartment 29.

A cargo section 30 has a conventional bow and center section (not shown) which terminate in a rear vertical bulkhead 31 from which two rectangular rearwardly tapering projections 32 extend containing the rectangular vertical channels 33. The forward section of the propulsion unit or section 20 terminates in a vertical bulkhead 34 containing the inwardly tapering rectangular recesses 35. Bulkhead 31 is backed up by the watertight bulkhead 36 and bulkhead 34 is backed up by the watertight bulkhead 37. The recesses 35 are entered by vertical rectangular openings 38 which accommodate the I beam pins 39.

Pins 39 are I beams with their flanges 60 and 61 disposed fore and aft and their bottoms 40 tapered. The inside of one inner flange 61 of each pin 39 has a rack gear 41 fixed thereto to be engaged by a pinion 42. The pinions 42 are mounted on a geared down winch 44 to be rotated to raise and lower pins 39. Pin guides 45 may be provided to slidably engage the flanges 60 and 61 of the pins 39 to support them in a raised position. Thus it may be seen that tanks 27 and 28 may be flooded or evacuated to trim a propulsion section 20 to the level of a cargo section 30 so that the projections 32 may be seated in the recesses 35 and the pins 39 lowered to connect the sections 20 and 30. By raising pins 39, the sections may be disconnected.

This simple connecting means is sufficiently strong to withstand the great stresses involved in connecting a sectional ship. The recesses 35 and the projections 32 should be sufficiently braced with interior beams or truss structures (not shown) to reinforce them. Bulkheads 36 and 37 ensure that the sections 20 and 30 remain watertight as they are not transfixed by the pins 39. The tapered bottoms 40 of the pins 39 guide their entry through the channels 33 of the projections 32. To draw the sections 20 and 30 together with a sufficient connecting force, the pins 39 may be tapered from front to back about three inches for each twenty five feet of length.

As a safety factor, pin 39 may be designed to fail before bulkheads 31 or 34 to prevent the loss of a section should a ship break up in extreme circumstances. Power lines and the like (not shown) with suitable disconnects may extend between the sections 20 and 30. While it is best to have the pins 39 and the winch 44 on the propulsion section 20, these elements could be located on the cargo section 30.

Figure 8:
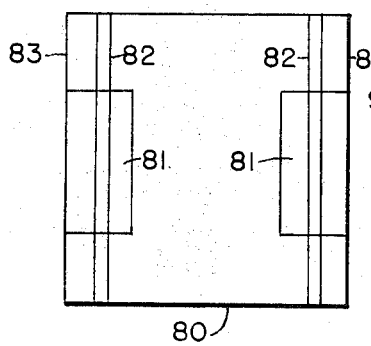
FIGS. 8–16 are schematic diagrams of mating configurations which may be used to join cargo and propulsion sections of ships according to this invention.
Figure 9:
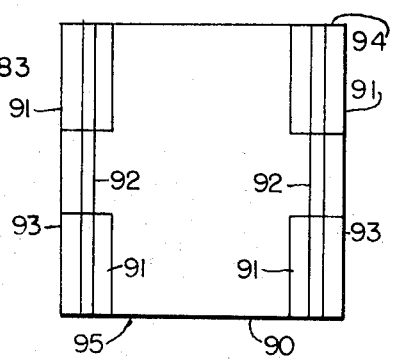
Figure 10:
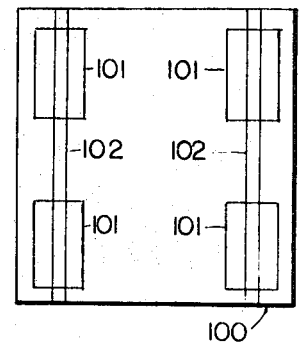
Figure 11:
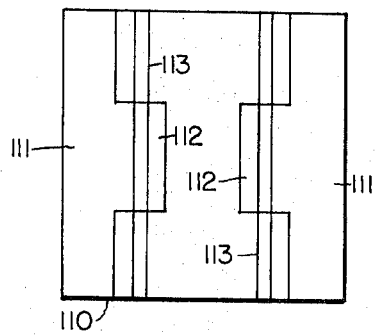
Figure 12:
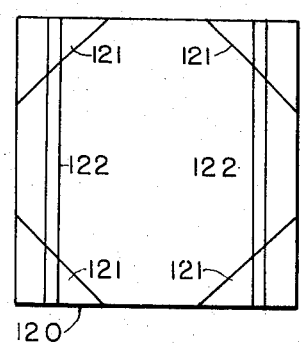
Figure 13:
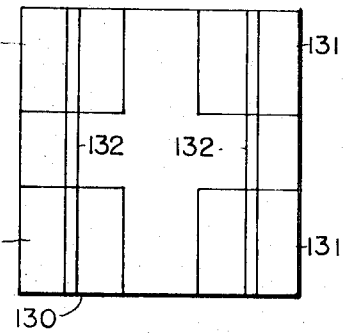

FIGS. 8–16 show specific alternate connection configurations. In FIG. 8 hull 80 has recesses 81 transfixed by pins 82. The recesses 81 are contiguous with the sides 83 of hull 80. In FIG. 9 hull 90 has four projections 91 transfixed by the pins 92. The projections are contiguous with the top 94 and the bottom 95 and the sides 93 of the hull 90. FIG. 10 shows a hull 100 containing four recesses 101 in vertically disposed pairs, each pair being transfixed by a pin 102. FIG. 11 shows a hull 110 having longitudinally recessed sides 111 with centrally extending recesses 112 through which pins 113 extend. FIG. 12 shows a hull 120 having triangular projecting corners 121 transfixed by pins 122. FIG. 13 shows a hull 130 having projecting square corners 131 transfixed by the pins 132.

Figure 14:
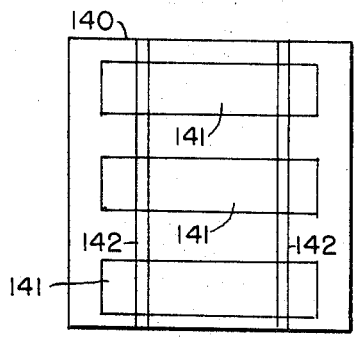
Figure 15:
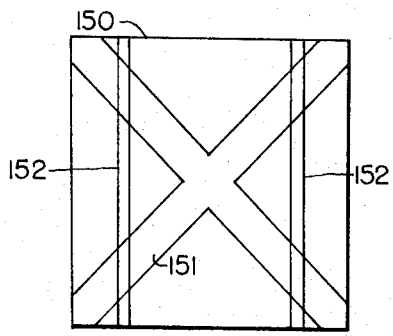
Figure 16:
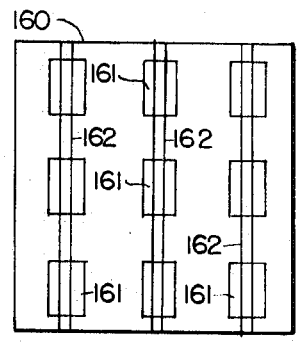

FIG. 14 shows a hull 140 containing three central horizontal recesses 141 transfixed by the pins 142. FIG. 15 shows a hull 150 containing an X shaped recess 151 transfixed by the pins 152. FIG. 16 shows a hull 160 containing nine recesses 161 in vertical rows of three, each vertical row being transfixed by a pin 162. Either the propulsion section or the cargo section of a hull may contain the projections or recesses described.

While this invention has been shown and described in the best forms known to me, it will nevertheless be understood that these are purely exemplary and that modifications may be made without departing from the spirit of the invention.

What is claimed is:

1. In a ship having a detachable aft propulsion section and a forward cargo section, connection means for said sections comprising, in combination, substantially vertical bulkheads at the forward end of said propulsion section and the aft end of said cargo section, said bulkheads containing recesses and having projections therefrom, said projections and said recesses mating, said projections containing vertical passages, means forming vertical passages above and below said recesses, vertical pins passing through said vertical passages transfixing said recesses and passing through aid projections within said recesses connecting said sections together, and means for raising and lowering said pins in said vertical passages to disconnect and connect said sections.

2. The combination according to claim 1 wherein said vertical passages above and below said recesses and within said projections are rectangular, said pins being I beams having flanges disposed fore and aft.

3. The combination according to claim 2 wherein said means raising and lowering said pins comprises a rack fixed on the inner side of a flange of each pin, a spur gear engaging each of said racks, and means driving said spur gears.

4. The combination according to claim 3 wherein said projections are disposed on said cargo section and said recesses are disposed within said propulsions sections, said means raising and lowering said pins being disposed on said propulsion section.

5. The combination according to claim 4 wherein said projections taper rearwardly and said recesses taper inwardly mating with said projections.

6. The combination according to claim 5 wherein said projections and said recesses are rectangular.

7. The combination according to claim 4 wherein said pins have tapering bottom portions.

8. The combination according to claim 7 wherein the flanges of said pins taper toward each other as they extend downward about three inches for each twenty five feet of length.

9. The combination according to claim 4 with the addition of transverse bulkheads disposed behind said bulkheads containing said recesses and having said projections.

References Cited

UNITED STATES PATENTS

| | | | |
|---|---|---|---|
| 2,328,693 | 9/1943 | Taylor | 114—77 |
| 3,398,716 | 8/1968 | Neilson | 114—235 |

TRYGVE M. BLIX, Primary Examiner